(12) United States Patent
Tanimoto

(10) Patent No.: US 6,963,418 B1
(45) Date of Patent: Nov. 8, 2005

(54) COMMUNICATION SYSTEM AND METHOD

(75) Inventor: Yoshifumi Tanimoto, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 989 days.

(21) Appl. No.: 09/603,219

(22) Filed: Jun. 26, 2000

(30) Foreign Application Priority Data

Jul. 12, 1999 (JP) .................................. 11-198180

(51) Int. Cl.⁷ ...................... G06F 15/00; G06F 15/167; H04M 1/00; G11B 11/00
(52) U.S. Cl. .................... 358/1.15; 358/1.16; 709/216; 379/355.02; 369/13.16; 369/13.25
(58) Field of Search .............................. 358/1.15, 1.16, 358/404, 440, 444, 409, 425; 708/174; 702/188; 717/173; 379/100.01, 88.13, 355.02; 370/216; 455/557; 365/185.11; 709/203, 216; 375/240.12; 710/4, 20, 33; 369/13.16, 13.25

(56) References Cited

U.S. PATENT DOCUMENTS 5,414,528 A * 5/1995 Hatamura .................... 358/440

| | | | | |
|---|---|---|---|---|
| 5,787,288 A | * | 7/1998 | Nagata et al. ............... | 717/173 |
| 5,991,197 A | * | 11/1999 | Ogura et al. ............ | 365/185.11 |
| 6,081,296 A | * | 6/2000 | Fukunaga et al. ...... | 375/240.12 |
| 6,373,940 B2 | * | 4/2002 | Shaffer et al. .......... | 379/355.02 |
| 6,377,664 B2 | * | 4/2002 | Gerszberg et al. ....... | 379/88.13 |
| 6,493,743 B2 | * | 12/2002 | Suzuki ....................... | 709/203 |

FOREIGN PATENT DOCUMENTS

JP 64-44674 2/1989

* cited by examiner

Primary Examiner—Kimberly Williams
Assistant Examiner—Thomas J Lett
(74) Attorney, Agent, or Firm—Hogan & Hartson LLP

(57) ABSTRACT

Administering client computer (3) is connected to a plurality of facsimile machines (1) over a LAN (2). The facsimile machines (1) store quick-dial telephone numbers in RAM (11), and operating programs in flash memory (13). The computer (3) sends replacement data for the quick-dial telephone numbers and the operating programs of the facsimile machines (1) to the facsimile machines (1) over the LAN (2). The facsimile machines that receive the replacement data then overwrite the telephone numbers and operating programs with the replacement data.

23 Claims, 4 Drawing Sheets

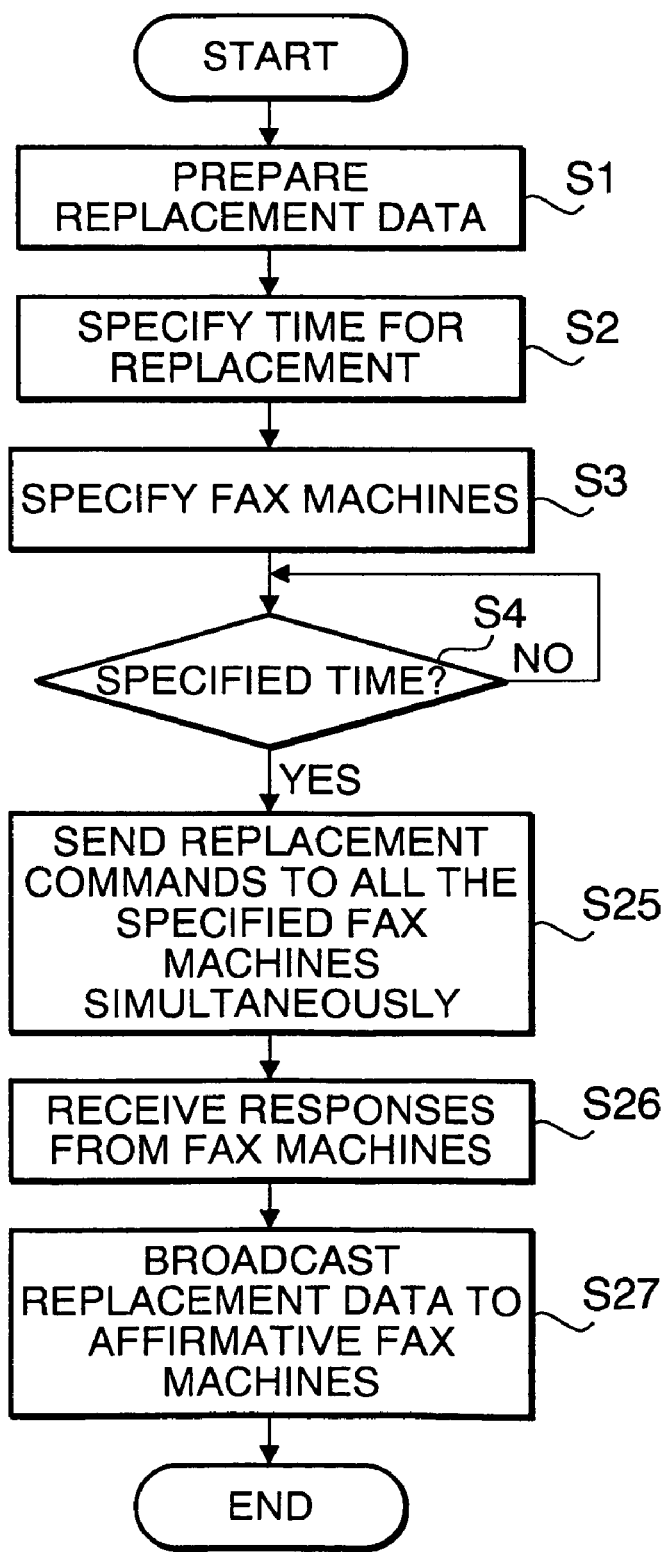

COMMUNICATION SYSTEM AND METHOD

BACKGROUND OF THE INVENTION

1. Field of the Invention

The present invention relates to a communication system in which a communication device such as a facsimile machine and an external device that manages the facsimile machine are connected to each other via a computer network such as a Local Area Network (a "LAN"), and more particularly, to such a communication system in which replacement data sent from the external device is used to overwrite data already stored at the communication device. The present invention also relates to a communication method suited for such communication system.

2. Description of the Related Art

In recent years, various LAN-capable communication systems have been developed. In one such system, a plurality of communication devices (facsimile machines) and an administrating computer are connected over a LAN.

The facsimile machines normally store speed-dial lists of telephone numbers or other data for quick dialing in order to improve the efficiency of the system during transmission. Conventionally, when the administration center (computer) that manages the facsimile machines needs to update the data in the quick dial lists or update other information such as the programming of the facsimile machines, it dials each facsimile machine one-by-one over the PSTN and overwrites the old data with replacement data.

There are several drawbacks to updating the data stored at the network facsimile machines using this conventional system. First, since the administrating computer overwrites the data at the network facsimile machines over the PSTN ("Publicly Switched Telephone Network"), a procedure for data overwriting may be time consuming and may increase communication costs. Further, if an error occurs during data transmission, the data overwriting procedure always fails. Still further, this process must be performed individually for each facsimile machine, thus increasing the total amount of time and communication cost required to overwrite data at a plurality of facsimile machines. It is thus desirable to find a more efficient way to update the data stored at the network communication devices of such a communication system.

SUMMARY OF THE INVENTION

It is therefore an object of the present invention to provide a communication system and method that reduce the time and cost of overwriting data at one or more communication devices.

In order to accomplish this object, according to a first aspect of the present invention, the communication system of the present invention includes at least one communication device, each of which stores a first set of data and a second device connected to the communication device over a network, wherein the second device includes a transmission unit that transmits replacement data to the communication device over the network, and each communication device includes a storage unit that stores the first set of data, a reception unit that receives the replacement data, and an overwriting unit that writes the replacement data over the first set of data. Thus, replacement data used to overwrite a first set of data (the contents in a quick dial list or operational programs, for example) stored at the communication device is sent from the administrating second device to the communication device over the network (e.g., LAN). The communication device receives the replacement data and writes that data over the first set of data. Since the replacement data is sent over the network and not the PSTN, the processing time and cost needed for the second device to update the data stored at the communication device can be significantly reduced.

When the communication system includes two or more communication devices, each of the communication devices may receive replacement data from the second device and overwrites the first set of data simultaneously. This significantly reduces the processing time and cost needed for the second device to update the data stored at a plurality of communication devices.

The second device may be provided with a timer, and replacement data may be sent to the communication device(s) when the timer detects a specified time. This allows the procedure to be performed at an arbitrarily determined timing such as at night when the communication devices are not ordinarily in use.

It should be noted that although the terms "replacement data" and "overwrite" have been used for convenience, their meaning is not meant to limit the present invention to the replacement of data in its entirety. As described herein, the "replacement data" may be additional data to be appended to a table or the like, or may be only particular cells of a table stored in the memory of the communication device.

BRIEF DESCRIPTION OF THE DRAWINGS

FIG. 4 is a flow chart showing another example of the procedure performed by the administrating computer of the communication system shown in FIG. 1.

DETAILED DESCRIPTION OF THE INVENTION

Preferred embodiments of the present invention will now be described in detail with reference to the accompanying drawings.

Figure 1:
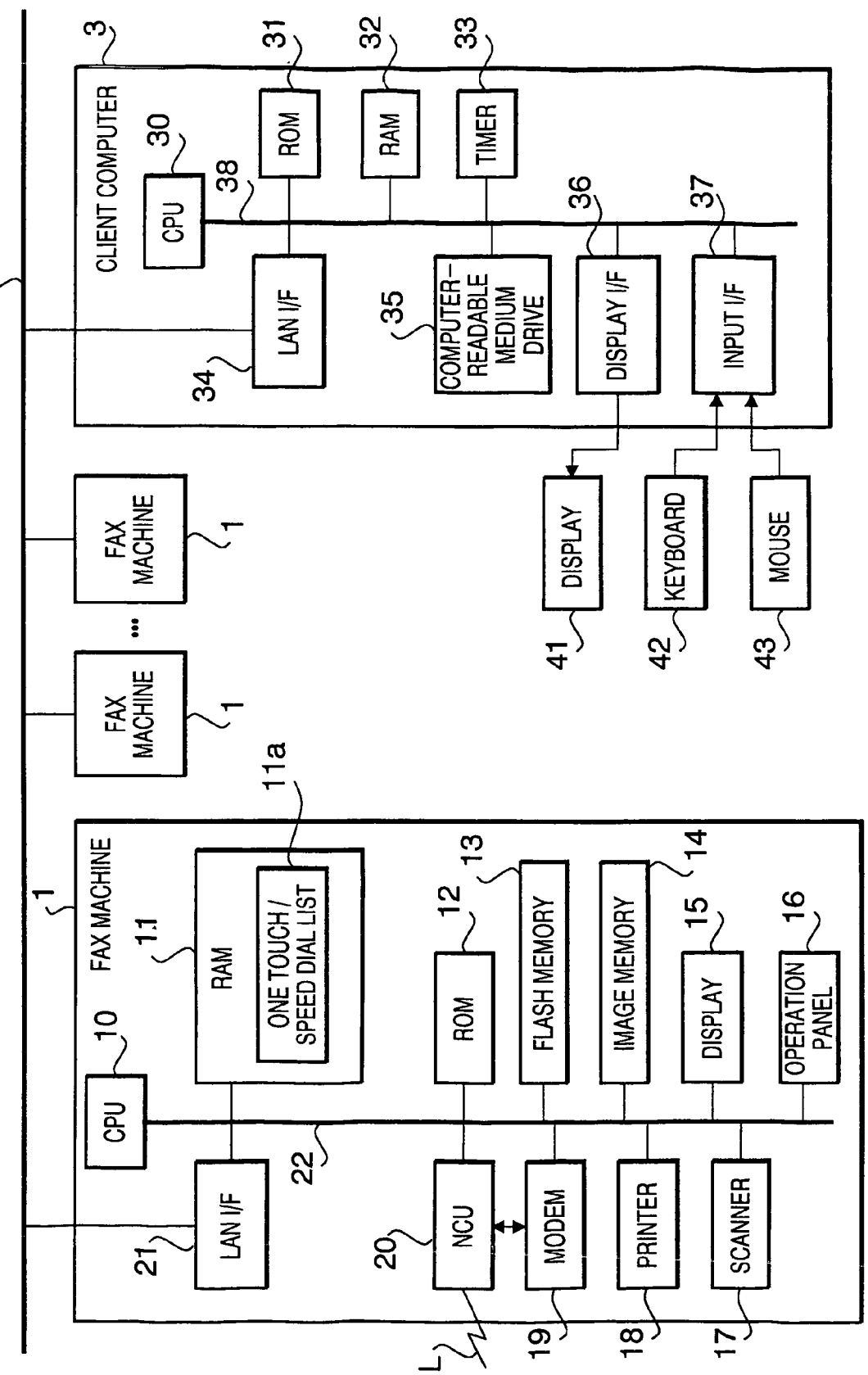
FIG. 1 is a block diagram of the communication system of the present invention.

Referring to FIG. 1, illustrated is a basic arrangement of a communication system of the present invention in which each of facsimile machines 1 is used for the communication device of the invention. Each of the facsimile machines 1 has essentially the same internal structure, and connected over a LAN 2. An administrating client computer 3 that manages the plurality of facsimile machines 1 is also connected to the LAN 2.

Each facsimile machine 1 is essentially comprised of a CPU 10, a RAM 11, a ROM 12, a flash memory 13, an image memory 14, a display unit 15, an operation panel 16, a scanner 17, a printer 18, a modem 19, a Network Control Unit ("NCU") 20 for connecting to the publicly switched telephone network ("PSTN"), and a LAN interface (LAN I/F) 21.

In each facsimile machine 1, the CPU 10 controls the various hardware elements of the machine 1 over an internal BUS 22, and executes the various software functions of the machine according to computer programs stored in the ROM 12 or flash memory 13.

RAM 11 stores various data, including a one-touch and speed dial list 11a of telephone numbers.

ROM 12 stores a data overwriting program for updating or changing the data stored in RAM 11. Flash memory 13 also stores various programs used in machine operation. Image memory 14 may include DRAM or the like, and stores image data that is to be sent or that has been received from other machines.

Display unit 15 includes an LCD, CRT, or similar display device, and displays among other information the operational status of the machine 1. It may also display image data of a document to be sent to another machine, or the image data received from another machine. Operation panel 16 includes various function keys used to operate the machine 1; these keys may include, for example, a number pad, quick-dial keys, and the like. Display unit 15 may be comprised as a touch panel display, and may display all or only some of the function keys used to operate the machine 1 so as to serve as the second operational panel.

Scanner 17 scans a document using a CCD, and outputs document image data. Printer 18 may be comprised as an electro-photographic printing device, and is used to print out hard copies of image data received from other facsimile machines, or the image data scanned by the scanner 17.

Modem 19 is connected over BUS 22, and is a fax capable modem. The modem 19 is directly connected to the NCU 20. NCU 20 functions to connect and disconnect between an analog L and PSTN line (not shown), and when necessary connects the PSTN with the modem 19. By providing a DSU ("Digital Service Unit") the machine 1 can be allowed to connect to a digital ISDN line using a baseband transmission method.

LAN I/F 21 connects the machine 1 to a node on the LAN 2, enabling the machine 1 to communicate with client computer 3 over the LAN 2.

The administrating client computer 3 is principally comprised of a CPU 30, a ROM 31, a RAM 32, a timer 33, a LAN I/F 34, a drive for computer-readable medium, a display interface 36 ("Display I/F"), and an input interface 37 ("Input I/F").

CPU 30 controls the computer's hardware components over internal BUS 38, and executes software functions according to computer programs stored in ROM 31.

ROM 31 is pre-loaded with various computer programs required to operate the computer 3. RAM 32 includes SRAM, DRAM or the like, and temporarily stores data generated during execution of the computer programs.

Timer 33 keeps time, and as described below, detects a specified time (the time at which a data overwriting procedure to be carrier out). LAN I/F 34 connects the computer 3 with a note on the LAN 2, allowing it to communicate with the facsimile machines 1 in the network. Storage medium drive 35 is adapted to drive a computer-readable medium such as optical disk, CD-ROM, floppy disk, or the like, which is loaded thereinto by a user.

The display device 41 may be comprised as an LCD or CRT display, and may be enabled to display data received from the facsimile machines 1. The display 41 is connected to display interface 36. Input devices used to operate the computer 3 are also connected to the computer 3, and may include a keyboard 42, a mouse 43, and an input interface 37.

Operation

The communication system essentially functions such that at a specified time, the administrating computer 3 transmits replacement data to selected facsimile machines 1, to replace dialing list data in the speed-dial list 11a in the RAM 11 and to replace operational programs stored in the flash memory 13 of the individual facsimile machines 1. The facsimile machines 1 that receive the replacement data then execute a procedure to overwrite the data in the speed dial list 11a stored in RAM 11 and to overwrite operational programs stored in the flash memory 13.

The Administrating Computer

The operation of the administrating computer 3 will now be described with reference to the flow chart in FIG. 2.

When the program is launched, the CPU 30 of the computer 3 establishes replacement data (Step S1), and specifies a time at which the replacement data will be sent to a particular facsimile machine 1 to overwrite the existing data (Step S2). Next, the facsimile machine 1 at which the data is to be overwritten is specified (Step S3).

The timer 33 is set to detect whether or not the current time equals the specified time. If the current time is not the specified time, then the program loops back and repeats the determination of step S4. When the current time equals the specified time (Step S4: YES), then the CPU 30 transmits data overwriting instructions to the specified facsimile machine 1 over LAN 2 (Step S5). The CPU 30 then determines whether or not a reply is received indicating that the specified facsimile machine 1 is capable of overwriting the data (Step S6). If the affirmative replay is received (Step S6: YES), then the computer 3 sends the actual replacement data to the facsimile machine 1 (Step S7). Alternatively, if no reply is received or if a reply indicating that the data cannot be overwritten (Step S6: NO), then the program proceeds to step S8 without sending the replacement data.

At step S8, the CPU 30 determines whether or not there are specified facsimile machines 1 remaining to which replacement data must be sent. (It should be noted that more than one facsimile machine 1 may be specified at step S3). If so (Step S8: YES), then the program returns to step S5 and repeats steps S5 through S7 for the remaining facsimile machines. Once the replacement data has been sent to all of the specified facsimile machines 1 (Step S8: NO), then the program ends.

It should be noted that this replacement data transmission procedure executed by the client computer 3 may be arranged such that if the response indicating whether or not a specified facsimile machine is able to overwrite data is not received, the overwrite instruction is resent to the facsimile machine 1. Additionally, if a response indicating that data overwriting is not possible (for example, because the power is off, or overwriting has been disabled), or if no response is received from the facsimile machine 1, then data specifying that facsimile machine 1 may be stored at the client computer 3, and the overwriting procedure attempted again later.

The Network Facsimile Machine

The operation performed by the network facsimile machine(s) 1 will now be described with reference to the flow chart in FIG. 3.

When the network facsimile machine 1 receives a data overwrite command from the client computer 3 (Step S11), the CPU 10 of the facsimile machine 1 determines whether or not it can overwrite the data (Step S12). If not (Step S12: NO) then the facsimile 1 sends a reply indicating it cannot overwrite the data to the client computer 3 (Step S16), and ends the procedure. If, however, the network facsimile 1 is capable of overwriting the data (Step S12: YES), then it sends a response to the client computer 3 indicating that it can overwrite the data (Step S13) and proceeds to step S14.

At step S14, the network facsimile 1 receives the replacement data from the client computer 3 over the LAN 2, and writes the replacement data into either the quick-dial list 11*a* in RAM 11 and/or flash memory 13 (Step S15).

It should be noted that the data overwriting procedure performed by the network facsimile machine may be arranged such that after overwriting the data, a message is sent back to the client computer 3 indicating that the data has been successfully overwritten. In such case, the client computer 3 then receives confirmation that the data overwriting has been completed.

Simultaneous Transmission from the Administrating Computer

An alternate operation performed by the administrating computer 3 will now be described with reference to the flow chart in FIG. 4. In this example of the procedure, the replacement data is broadcast simultaneously to all the facsimile machines 1 selected in the system.

Figure 2:
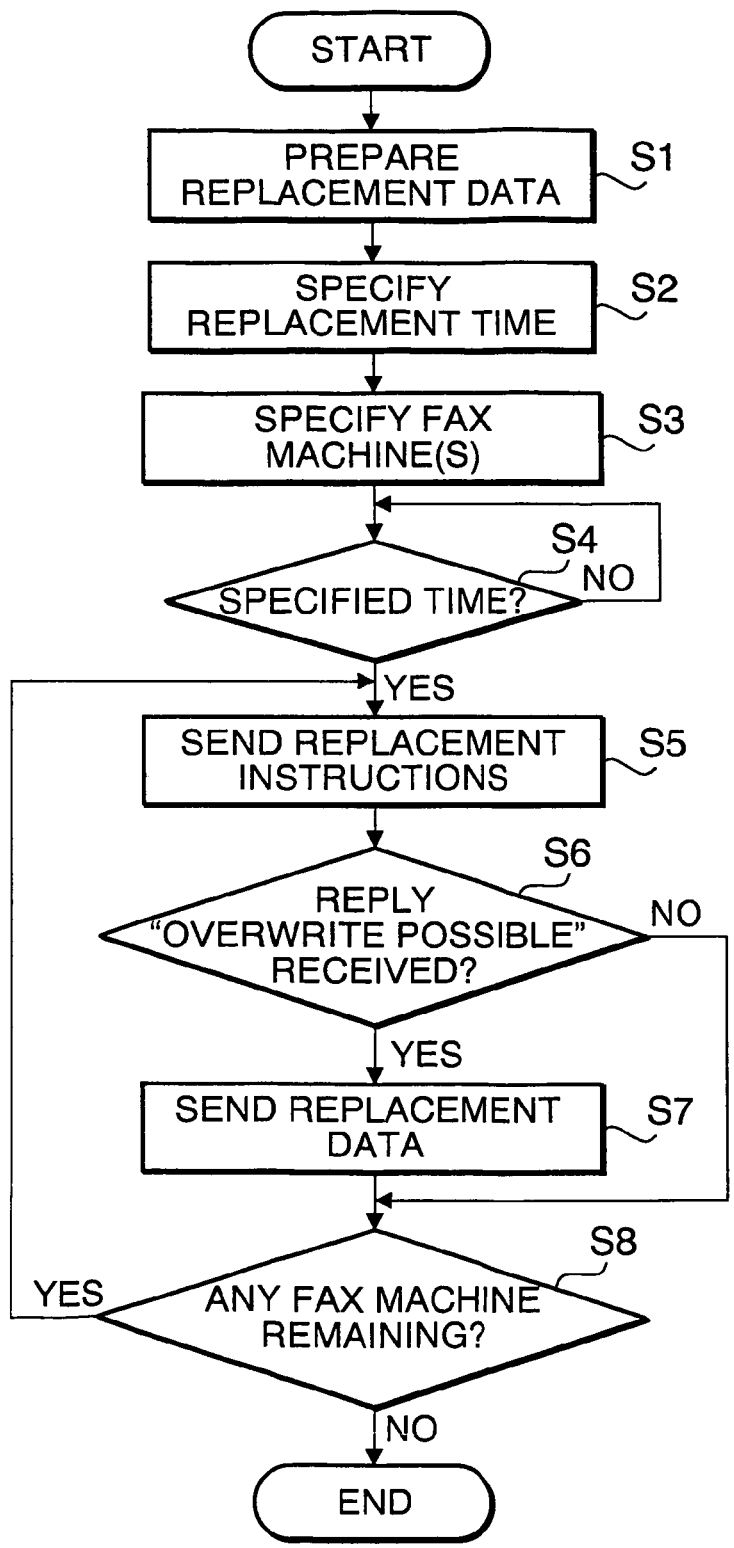
FIG. 2 is a flow chart showing an embodiment of the procedure performed by an administrating computer (client computer) of the communication system shown in FIG. 1.

The start of this procedure uses the same steps employed in the flow chart shown in FIG. 2 (steps S1 to S4), and so steps that are the same have been labeled with the same reference numbers.

In this example, it should be assumed that at least two facsimile machines 1 are specified at step S3. When the current time reaches the specified time (Step S4: YES), then the administrating computer 3 simultaneously broadcasts the data overwrite command over the LAN 2 to all the facsimile machines 1 specified at step S3 (Step S25). The computer 3 then receives responses from the facsimile machines 1 indicating whether or not they can overwrite the data (Step S26). The administrating computer 3 then simultaneously broadcasts the replacement data to all the facsimile machines 1 that responded in step S26 that that they were able to overwrite the data (Step S27).

Figure 3:
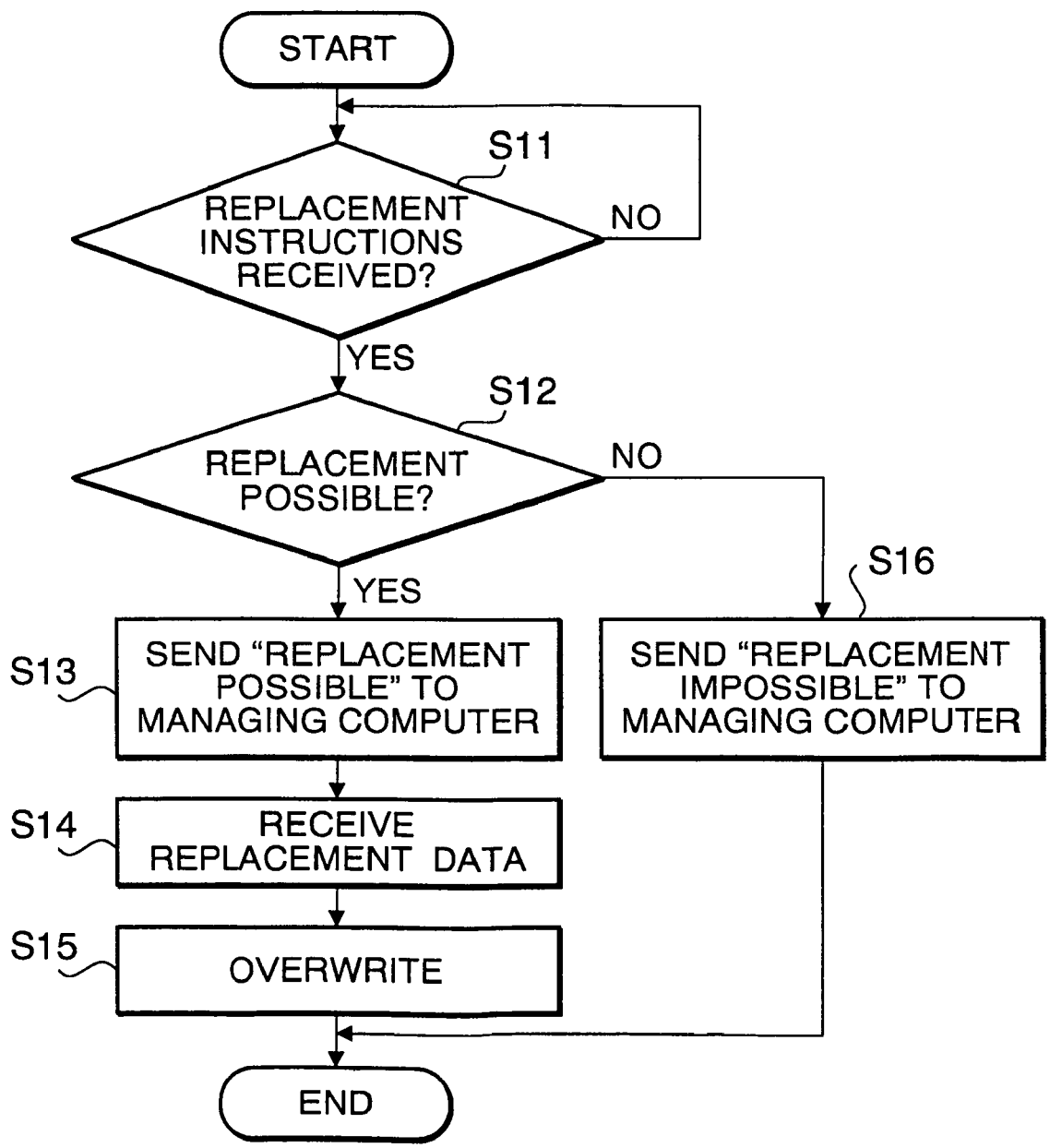
FIG. 3 is a flow chart showing an example of the procedure performed by a communication device (facsimile machine) of the communication system shown in FIG. 1.

The operation performed by the facsimile machines 1 in response to that performed by the administrating computer 3 according to the flow chart shown in FIG. 4 would be essentially the same as that described by the flow chart in FIG. 3. The facsimile machines 1 that receive the replacement data from the computer 3 overwrite the old data with the replacement data at roughly the same time.

It should be noted that although the replacement data in the embodiments disclosed herein include quick-dial numbers and/or operating programs, replacement data encompasses a wide variety of other data. Additionally, the replacement data can be introduced to the client computer via optical disk, CD-ROM, floppy disk, or other external storage medium, or received from an external device. Furthermore, the replacement data can directly be input into the client computer 3 by a user of the computer 3.

As described hereinabove, in the communication system and method of the present invention, replacement data that replaces a first set of data stored at a communication device is sent from an administrating device to the communication device via a network, whereupon the replacement data is written over the first set of data. This substantially reduces the processing time and cost needed for the communication device to update the data stored at the communication device, relative to the conventional system that utilizes the PSTN.

Additionally, the communication system and method of the present invention may allow the replacement data to be simultaneously transmitted from the administrating device to a plurality of communication devices, and allow the data at the communication devices to be simultaneously overwritten with the replacement data. This further reduces the time and cost needed to update data stored at a plurality of communication devices.

Still further, the communication system of the present invention allows the replacement data to be sent from the administrating machine to the communication devices, whereat the replacement data overwrites existing data, at a specified time. This allows the data overwriting process to be performed at an optimally selected time, when, for example, the communication device is not ordinarily in use, e.g., at night. Execution of overwriting process at such a time insures that the user can use the system with the updated information when he or she comes an office next morning.

The illustrated and described communication system and method are disclosed in Japanese Patent Application No. 11-198180 filed on Jul. 12, 1999 in JPO and the instant application claims priority of this Japanese patent application, the entire disclosure of which is incorporated herein by reference.

What is claimed is:

1. A communication system including at least one communication device, each of which stores a first set of data and generates a response upon receiving data or instructions, and a second device connected to each of the at least one communication device over a computer network, wherein the second device includes a transmission unit that transmits replacement data to at least one of the at least one communication device via the computer network, and wherein the second device transmits an overwrite instruction to the at least one communication device via the computer network, and wherein the second device re-transmits the same overwrite instruction to the at least one communication device via the computer network if the response is not received by the second device, and each of the at least one communication device includes a storage unit capable of storing the first set of data, a reception unit that receives said replacement data, and an overwriting unit that writes the replacement data over the first set of data.

2. The communication system of claim 1 wherein the at least one communication device includes a plurality of communication devices, and the replacement data is received from the second device simultaneously by at least two of the plurality of communication devices.

3. A communication system including at least one communication device, each of which stores a first set of data and generates a response upon receiving data or instructions, and a second device connected to each of the at least one communication device over a computer network, wherein the second device includes a transmission unit that transmits replacement data to at least one of the at least one communication device via the computer network, and wherein the second device transmits an overwrite instruction to the at least one communication device via the computer network, and wherein the second device re-transmits the overwrite instruction to the at least one communication device via the computer network if the response is not received by the second device, and each of the at least one communication device includes a storage unit capable of storing the first set of data, a reception unit that receives said replacement data, and an overwriting unit that writes the replacement data over the first set of data, wherein the second device further includes a timer that detects time, and the replacement data is sent to the communication device when the timer detects a predetermined time.

4. A communication system including at least one communication device, each of which stores a first set of data and generates a response upon receiving data or instructions, and a second device connected to each of the at least one communication device over a computer network, wherein the second device includes a transmission unit that transmits replacement data to at least one of the at least one communication device via the computer network, and wherein the second device transmits an overwrite instruction to the at least one communication device via the computer network, and wherein the second devices re-transmits the overwrite instruction to the at least one communication device via the computer network if the response is not received by the second device, and each of the at least one communication device includes a storage unit capable of storing the first set of data, a reception unit that receives said replacement data, and an overwriting unit that writes the replacement data over the first set of data, wherein the at least one communication device includes a plurality of communication devices, and the replacement data is received from the second device simultaneously by at least two of the plurality of communication devices, and wherein the second device further includes a timer that detects time, and the replacement data is sent to the communication device when the timer detects a predetermined time.

5. The communication system of claim 3 wherein the replacement data includes at least one of one-touch and quick-dial telephone numbers.

6. The communication system of claim 4 wherein the replacement data includes at least one of one-touch and quick-dial telephone numbers.

7. The communication system of claim 3 wherein the replacement data includes operating programs.

8. The communication system of claim 4 wherein the replacement data includes operating programs.

9. A communication system including a client computer, a local area network, and a plurality of facsimile machines connected to the client computer over the local area network, wherein at least two of the plurality of facsimile machines store at least either quick-dial telephone numbers or operating programs and generate a response upon receiving data or instructions from the client computer, and wherein the client computer transmits an overwrite instruction to at least one of the two facsimile machines, and wherein the client computer re-transmits the same overwrite instruction to at least one of the two facsimile machines if the response is not received by the client computer, and wherein the client computer simultaneously transmits replacement data to at least one of the two facsimile machines over the Local Area Network if the response is received by the client computer.

10. A communication system including a client computer, a local area network, and a plurality of facsimile machines connected to the client computer over the local area network, wherein at least two of the plurality of facsimile machines store at least either quick-dial telephone numbers or operating programs and generate a response upon receiving data or instructions from the client computer, and wherein the client computer transmits an overwrite instruction to at least one of the two facsimile machines, and wherein the client computer re-transmits the overwrite instruction to at least one of the two facsimile machines if the response is not received by the client computer, and wherein the client computer simultaneously transmits replacement data to at least one of the two facsimile machines over the Local Area Network if the response is received by the client computer, wherein the client computer is provided with a timer that detects time, and the replacement data is sent to the facsimile machines when the timer detects a predetermined time.

11. A communication system including a client computer, a local area network, and a plurality of facsimile machines connected to the client computer over the local area network, wherein at least two of the plurality of facsimile machines store at least either quick-dial telephone numbers or operating programs and generate a response upon receiving data or instructions from the client computer, and wherein the client computer transmits an overwrite instruction to at least one of the two facsimile machines, and wherein the client computer re-transmits the overwrite instruction to at least one of the two facsimile machines if the response is not received by the client computer, and wherein the client computer simultaneously transmits replacement data to at least one of the two facsimile machines over the Local Area Network if the response is received by the client computer, wherein the client computer transmits a data overwriting instruction to said facsimile machines, and said facsimile machines reply to the client computer indicating whether or not they are capable of overwriting the data.

12. A data overwriting method for a communication system that includes at least one communication device each of which stores a first set of data and generates a response upon receiving data or instructions, and a second device connected to the at least one communication device over a computer network, the data overwriting method comprising the steps of:

transmitting an overwrite instruction from the second device to the at least one communication device via the computer network;

re-transmitting the same overwrite instruction from the second device to the at least one communication device via the computer network if the response is not received by the second device;

transmitting replacement data from the second device to the at least one communication device over the computer network if the response is received by the second device; and replacing the first set of data with the replacement data at the at least one communication device.

13. The data overwriting method of claim 12 wherein the at least one communication device includes at least two communication devices, and the replacement data is transmitted from the second device to the two or more of the at least two communication devices simultaneously.

14. A data overwriting method for a communication system that includes at least one communication device each of which stores a first set of data and generates a response upon receiving data or instructions, and a second device connected to the at least one communication device over a computer network, the data overwriting method comprising the steps of:

transmitting an overwrite instruction from the second device to the at least one communication device via the computer network;

re-transmitting the overwrite instruction from the second device to the at least one communication device via the computer network if the response is not received by the second device;

transmitting replacement data from the second device to the at least one communication device over the computer network if the response is received by the second device; and replacing the first set of data with the replacement data at the at least one communication device, wherein the second device is provided with a timer that detects time, and the step of transmitting the replacement data is performed when the timer detects a specified time.

15. A data overwriting method for a communication system that includes at least one communication device each of which stores a first set of data and generates a response upon receiving data or instructions, and a second device connected to the at least one communication device over a computer network, the data overwriting method comprising the steps of:

transmitting an overwrite instruction from the second device to the at least one communication device via the computer network;

re-transmitting the overwrite instruction from the second device to the at least one communication device via the computer network if the response is not received by the second device;

transmitting replacement data from the second device to the at least one communication device over the computer network if the response is received by the second device; and replacing the first set of data with the replacement data at the at least one communication device, wherein the at least one communication device includes at least two communication devices, and the replacement data is transmitted from the second device to the two or more of the at least two communication devices simultaneously, and wherein the second device is provided with a timer that detects time, and the step of transmitting the replacement data is performed when the timer detects a specified time.

16. The data overwriting method of claim 12 wherein the replacement data includes at least either quick-dial telephone numbers or operating programs.

17. The data overwriting method of claim 13 wherein the replacement data includes quick-dial telephone numbers.

18. The data overwriting method of claim 14 wherein the replacement data includes quick-dial telephone numbers.

19. The data overwriting method of claim 15 wherein the replacement data includes quick-dial telephone numbers.

20. The data replacement method of claim 12 wherein the communication device is a facsimile machine.

21. The communication system of claim 1 wherein the second device transmits the replacement data to the at least one communication device via the computer network upon receiving the response from the at least one communication device.

22. A communication system including at least one communication device, each of which stores a first set of data and generates a response upon receiving data or instructions, and a second device connected to each of the at least one communication device over a computer network, wherein the second device includes a transmission unit that transmits replacement data to at least one of the at least one communication device via the computer network, and wherein the second device transmits an overwrite instruction to the at least one communication device via the computer network, and wherein the second device re-transmits the overwrite instruction to the at least one communication device via the computer network if the response is not received by the second device, and each of the at least one communication device includes a storage unit capable of storing the first set of data, a reception unit that receives said replacement data, and an overwriting unit that writes the replacement data over the first set of data, wherein the replacement data or data specifying the at least one communication device is stored at the second device if the response from the at least one communication device indicates that the overwrite instruction is not executable due to a power failure or to a disabled overwriting unit.

23. A communication system including at least one communication device, each of which stores a first set of data and generates a response upon receiving data or instructions, and a second device connected to each of the at least one communication device over a computer network, wherein the second device includes a transmission unit that transmits replacement data to at least one of the at least one communication device via the computer network, and wherein the second device transmits an overwrite instruction to the at least one communication device via the computer network, and wherein the second device re-transmits the overwrite instruction to the at least one communication device via the computer network if the response is not received by the second device, and each of the at least one communication device includes a storage unit capable of storing the first set of data, a reception unit that receives said replacement data, and an overwriting unit that writes the replacement data over the first set of data, wherein the replacement data or data specifying the at least one communication device is stored at the second device is the response from the at least one communication device is not received by the second device.

* * * * *